(12) United States Patent
Sawai et al.

(10) Patent No.: US 7,755,269 B2
(45) Date of Patent: Jul. 13, 2010

(54) SPACER AND IMAGE DISPLAY PANEL USING THE SAME

(75) Inventors: Yuichi Sawai, Mito (JP); Osamu Shiono, Hitachi (JP); Takashi Namekawa, Hitachi (JP); Nobuhiko Hosotani, Mobara (JP); Hiroshi Ito, Chiba (JP); Keiichi Kanazawa, Ome (JP); Takashi Naitou, Funabashi (JP); Hiroyuki Akata, Hitachi (JP); Mitsuo Hayashibara, Hitachinaka (JP); Shigemi Hirasawa, Chiba (JP); Motoyuki Miyata, Hitachinaka (JP); Hiroki Yamamoto, Hitachi (JP)

(73) Assignee: Hitachi Displays, Ltd., Mobara-shi (JP)

( * ) Notice: Subject to any disclaimer, the term of this patent is extended or adjusted under 35 U.S.C. 154(b) by 621 days.

(21) Appl. No.: 11/620,118

(22) Filed: Jan. 5, 2007

(65) Prior Publication Data
US 2007/0159056 A1  Jul. 12, 2007

(30) Foreign Application Priority Data

Jan. 6, 2006   (JP) ............................. 2006-001358
Feb. 22, 2006  (JP) ............................. 2006-045225
Feb. 24, 2006  (JP) ............................. 2006-048412

(51) Int. Cl.
    *H01J 1/62* (2006.01)
(52) U.S. Cl. ...................... 313/495; 313/483; 252/512
(58) Field of Classification Search ......... 313/483–487, 313/292, 495–497; 428/423; 252/512
    See application file for complete search history.

(56) References Cited

U.S. PATENT DOCUMENTS 5,770,918 A *   6/1998  Kawate et al. .............. 313/495
2002/0117960 A1 * 8/2002  Yi et al. ..................... 313/495
2002/0158571 A1 * 10/2002 Ando ......................... 313/496
2005/0181221 A1 * 8/2005  Martin et al. ............... 428/432

FOREIGN PATENT DOCUMENTS

| JP | 2000-057937 | 2/2000 |
| JP | 2000-082424 | 3/2000 |
| JP | 2000-206905 | 7/2000 |
| JP | 2003-192378 | 7/2003 |
| JP | 2003-317648 | 11/2003 |
| JP | 2004-250276 | 9/2004 |

* cited by examiner

*Primary Examiner*—Nimeshkumar D. Patel
*Assistant Examiner*—Mary Ellen Bowman
(74) *Attorney, Agent, or Firm*—Antonelli, Terry, Stout & Kraus, LLP.

(57) ABSTRACT

It is an object of the present invention to provide a spacer which has an adequate Young's modulus for a spacer used in an image display panel and allows free adjustment of an electric resistance value, and an image display panel using the spacer. The spacer SPC holds a gap between a back panel PNL1 including a signal line CL, a scanning line GL, and an electronic source ELS provided for the main surface of a back substrate SUB1, and a front panel PNL2 including a fluorescent material PH, a black matrix BM, and an anode AD provided for the main surface of a front substrate SUB2. The spacer comprises phosphate glass including the same transition metal element with different valences. For electrical conduction, the included same transition metal element with different valences allows the use of hopping conduction between transition metal atoms with different valences to perform adjustment of electric resistance relatively easily. The transition metal element is at least one of vanadium (V), tungsten (W), molybdenum (Mo), niobium (Nb), and iron (Fe).

18 Claims, 5 Drawing Sheets

SPACER AND IMAGE DISPLAY PANEL USING THE SAME

FIELD OF THE INVENTION

The present invention relates to a spacer for holding a gap forming a decompressed space at a predetermined value between insulating substrates, and an image display panel formed by using the spacer.

BACKGROUND OF THE INVENTION

Glass materials as a structural material may require mechanical strength against compression or buckling, shear or break or the like. For example, in an image display panel of a type in which two flat insulating substrates are bonded and the inside of them is decompressed or evacuated, spacers (gap holding members) intervene between the insulating substrates to hold the gap between the insulating substrates at a predetermined value. The following description will be made assuming that such spacers are used, but it goes without saying that the present invention is not limited thereto.

Various types are known as an image display using an image display panel formed by bonding two flat insulating substrates (a back substrate and a front substrate), or a so-called flat-type display. For example, attention has been focused on an image display panel which has electronic sources arranged in a matrix (FPD: flat panel display). Well-known examples of those image display panels include an FED (Field Emission Display) panel and an electron emission display panel using small cold cathode which can be integrated. Cool cathodes of the type include a Spindt electronic source, a surface conductive electronic source, a carbon nanotube electronic source, an MIM (Metal-Insulator-Metal) type including a stack of metal, insulator, and metal, an MIS (Metal-Insulator-Semiconductor) type including a stack of metal, insulator, and semiconductor, and a thin film electronic source including metal, insulator, semiconductor, and metal.

In the electron emission FPD, a back substrate including electronic sources described above is bonded to a front substrate including a fluorescent material layer and an anode providing an acceleration voltage for causing electrons emitted from the electronic sources to strike the fluorescent material layer, and the internal space between the opposed substrates is sealed at a predetermined reduced pressure or a vacuum. The back substrate includes a number of electronic sources arranged in a matrix. The front substrate includes the fluorescent material layer and the anode forming an accelerating voltage for forming an electric field for causing electrons emitted from the electronic sources to strike the fluorescent material layer.

Each of the electronic sources forms a pair with an associated fluorescent material layer into a unit picture element. In general, unit picture elements for three colors, that is, red (R), green (G), and blue (B), form a single picture element (color picture element or pixel). For the color picture element, a unit picture element is also called a sub-picture element (sub-pixel).

The gap between the back substrate and the front substrate is held at a predetermined interval by members (gap holding members, hereinafter referred to as spacers) called partitions arranged to support both substrates in a display area. The spacer is formed of a plate-shaped body made of insulating material such as glass and ceramic or a member having some electrical conductivity. The spacer is disposed in association with a plurality of picture elements at positions where they do not prevent the operation of the picture elements.

Patent Document 1 has disclosed a display in which a back substrate and a front substrate are used with a reinforcing plate and a high-vacuum container is formed by frame glass. Patent Document 2 has shown a disclosure of lead-free glass with a low melting point as frit glass for use in sealing a glass plate. Patent Document 2 has disclosed the lead-free glass with a low melting point containing $B_2O_3$ or $V_2O_5$, BaO instead of PbO—$B_2O_3$ which may cause environmental pollution.

Patent Document 3 has disclosed $V_2O_5$—$TeO_2$ glass.

| (Patent Document 1) | JP-A-2000-206905 |
| (Patent Document 2) | JP-A-2003-192378 |
| (Patent Document 3) | JP-A-2004-250276 |

BRIEF SUMMARY OF THE INVENTION

In the image display panel using the MIM electronic source, electronic sources (cathodes) and anodes are placed with a gap of approximately 1 mm to 5 mm between them, and a high voltage is applied across the anode to provide a potential difference of 3 kV to 10 kV. Thus, the spacer which bridges the substrates to hold the predetermined gap is electrically charged and discharge occurs to damage the cathode and another structural portion. To avoid this, the spacer needs to have some electrical conductivity to dissipate the electric charge.

The spacer has been conventionally formed of:

(1) a conductive ceramic material such as $Al_2O_3$ ceramic containing dispersed TiC particles or glass ceramic containing dispersed electrical conductive oxide particles;

(2) a spacer made of insulating material having its surface coated with a conductive film in a Sol-gel method;

(3) a spacer made of insulating material having its surface coated with a conductive film in a spatter method; and (4) Nb glass.

The material of (1) needs cutting of a sintered body of ceramic or a green sheet of glass ceramic, resulting in an extremely high cost. In the material of (2), the conductive film formed in the Sol-gel method has low reliability and the electric characteristics are not stable. The coat of (3) formed in the spatter method is extremely expensive.

It is an object of the present invention to provide a spacer which has an adequate Young's modulus for a spacer used in an image display panel and allows free adjustment of an electric resistance value, and an image display panel using the spacer.

The spacer according to the present invention is formed by using a phosphate glass containing a transition metal element. The phosphate glass containing the same transition metal element with different valences is used. For electric conduction, containing the same transition metal element with different valences allows the use of hopping conduction between the transition metal atoms with the different valences to perform adjustment of the electric resistivity relatively easily.

The used transition metal element includes at least one of vanadium (V), tungsten (W), molybdenum (Mo), niobium (Nb), and iron (Fe). This eliminates the need of the conventionally used step of providing a conductive layer on the surface of a spacer substrate formed of an insulating material to provide electrical conductivity, thereby making it possible to provide an inexpensive spacer with stable characteristics. The electric characteristics can be controlled by adjusting the ratio of amounts of $WO_3$, $V_2O_5$, and $P_2O_5$.

Since the step temperature at which the spacer is incorporated into the image display panel ranges from 400° C. to 500° C., it is necessary to use glass (with a glass transition point of 500° C. or higher) having heat resistance at those temperatures. To this end, the heat resistance is controlled by adjusting the ratio of amounts of $WO_3$, $V_2O_5$, $P_2O_5$, and BaO. The amount of BaO can be adjusted in accordance with the thermal expansion coefficient of panel glass on which the spacer is mounted, thereby adjusting the thermal expansion coefficient of the W-based glass.

The studies of the present inventors have shown that, when glass mainly made of $V_2O_5$ is used, the glass desirably contains 1 to 20 wt % of $WO_3$ (weight percentage), 20 to 40 wt % of $P_2O_5$, 5 to 25 wt % of BaO, and 25 to 45 wt % of $V_2O_5$.

The studies of the present inventors have shown that, when glass mainly made of $WO_3$ is used, the glass desirably contains 20 to 45 wt % of $WO_3$, 25 to 40 wt % of $P_2O_5$, 10 to 25 wt % of $V_2O_5$, 10 to 25 wt % of BaO, and 5 to 15 wt % of $MoO_3$.

In the present invention:

(1) $GeO_2$, SrO, CaO, and $TiO_2$ can be added to control electric characteristics;

(2) $Al_2O_3$, $Nb_2O_5$, $ZrO_2$, and MgO can be added to improve heat resistance;

(3) $Gd_2O_3$, $Al_2O_3$, $Nb_2O_5$, and $Sb_2O_3$ can be added to improve water resistance;

(4) $Gd_2O_3$ or a rare-earth element can be added to enhance mechanical strength; and (5) $CeO_2$ can be added to prevent blurring.

In addition, the amount of an alkaline element can be contained at 0.5 wt % or lower to prevent inhibition of electron conduction due to ion conduction.

The surface or end portions of the glass spacer can be modified by a thin film or the like to further enhance the functions.

Other objects, features and advantages of the invention will become apparent from the following description of the embodiments of the invention taken in conjunction with the accompanying drawings.

DESCRIPTION OF REFERENCE NUMERALS

| (Description of Reference Numerals) | |
|---|---|
| PNL1 | BACK PANEL |
| SUB1 | BACK SUBSTRATE |
| PNL2 | FRONT PANEL |
| SUB2 | FRONT SUBSTRATE |
| SPC | SPACER |
| GL | SCANNING LINE |
| CL | SIGNAL LINE |
| DL | DATA LINE SERVING AS LOWER ELECTRODE |
| ELS | ELECTRONIC SOURCE |
| AD | ANODE |
| BM | BLACK MATRIX |
| PH | FLUORESCENT MATERIAL LAYER |
| SDR | SCANNING SIGNAL LINE DRIVING CIRCIUT |
| DDR | IMAGE SIGNAL LINE DRIVING CIRCUIT |
| INS | TUNNEL INSULATING FILM |
| AED | UPPER ELECTRODE |

DETAILED DESCRIPTION OF THE INVENTION

The present invention will hereinafter be described in detail with reference to the drawings illustrating examples.

Example 1

In Example 1, an example of forming $V_2O_5$—$WO_3$ conductive glass will be described. Example 1 shows an example of melting of $V_2O_5$—$WO_3$ glass having conductivity, a thermal expansion coefficient of 60 to $80 \times 10^{-7}/°$ C., and a glass transition temperature of 450° C. or higher.

A starting material included $WO_3$ (manufactured by Wako Pure Chemical Industries, Ltd., at a purity of 99.9%), $V_2O_5$ (manufactured by Kojundo Chemical Laboratory Co., Ltd., at a purity of 99.9%), BaO (manufactured by Wako Pure Chemical Industries, Ltd., at a purity of 99.9%), $P_2O_5$ (manufactured by Kojundo Chemical Laboratory Co., Ltd., at a purity of 99.9%), $Sb_2O_3$ (manufactured by Kojundo Chemical Laboratory Co., Ltd., 99.9%), $Cr_2O_3$ (manufactured by Kojundo Chemical Laboratory Co., Ltd., 99.9%), $Al_2O_3$ (manufactured by Wako Pure Chemical Industries, Ltd., 99.9%), and $GeO_2$ (manufactured by Kojundo Chemical Laboratory Co., Ltd., at a purity of 99.9%). To form the $V_2O_5$—$WO_3$ conductive glass, the materials were mixed at a weight ratio shown in Table 1.

TABLE 1

Glass composition examples and characteristics of present invention

| Glass No. | Composition (weight %) | | | | | | Melting Temperature | Thermal Expansion coefficient ($\times 10^{-7}/°$ C.) | |
|---|---|---|---|---|---|---|---|---|---|
| | $WO_3$ | $P_2O_5$ | BaO | $V_2O_5$ | $MoO_3$ | $Al_2O_3$ | Others | 30-350° C. | 30-500° C. |
| TWS-1 | 15 | 25 | 15 | 30 | 15 | | | 1350° C. | 66.4 | 67.6 |
| TWS-2 | 25 | 35 | 15 | 20 | 5 | | | 1350° C. | 72.5 | 74.0 |

TABLE 1-continued

Glass composition examples and characteristics of present invention

| Glass No. | | | | | | | Additive | Melting temp | | |
|---|---|---|---|---|---|---|---|---|---|---|
| TWS-3 | 25 | 25 | 15 | 20 | 15 | | | 1350° C. | 80.0 | 82.8 |
| TWS-4 | 30 | 25 | 5 | 25 | 10 | 5 | | 1350° C. | 75.9 | 77.3 |
| TWS-5 | 35 | 25 | 15 | 20 | 5 | | | 1350° C. | 73.5 | 81.0 |
| TWS-6 | 40 | 25 | 15 | 15 | 5 | | | 1350° C. | 74.3 | 75.6 |
| TWS-7 | 45 | 25 | 5 | 20 | 5 | | | 1350° C. | 70.4 | 71.8 |
| TWS-8 | 50 | 15 | 10 | 20 | 5 | | | 1350° C. | 79.9 | 81.6 |
| TWS-9 | 15 | 40 | 15 | 15 | 15 | | | 1350° C. | 59.0 | 60.3 |
| TWS-10 | 20 | 40 | 5 | 15 | 15 | 5 | | 1350° C. | 57.0 | 58.3 |
| TWS-11 | 25 | 30 | 10 | 20 | 15 | | | 1350° C. | 56.0 | 57.2 |
| TWS-12 | 25 | 30 | 10 | 20 | 15 | | | 1350° C. | 75.0 | 76.7 |
| TWS-13 | 35 | 40 | 5 | 10 | 10 | | | 1350° C. | 77.0 | 78.7 |
| TWS-14 | 40 | 30 | 10 | 15 | 5 | | | 1350° C. | 78.5 | 80.2 |
| TWS-15 | 45 | 25 | 10 | 10 | 10 | | | 1350° C. | 80.0 | 81.8 |
| TWS-16 | 50 | 25 | 5 | 15 | 5 | | | 1350° C. | 75.0 | 76.7 |
| TWS-17 | 35 | 25 | 10 | 20 | 5 | | 5% SrO | 1350° C. | 69.7 | 71.0 |
| TWS-18 | 35 | 25 | 10 | 20 | 5 | | 5% $Gd_2O_3$ | 1350° C. | 76.1 | 77.7 |
| TWS-19 | 35 | 25 | 10 | 24.5 | 5 | | 0.5% $CeO_2$ | 1350° C. | 80.0 | 86.9 |
| TWS-20 | 35 | 25 | 10 | 20 | 5 | | 5% $Sb_2O_3$ | 1350° C. | 79.7 | 81.2 |
| TWS-21 | 35 | 25 | 10 | 20 | 5 | | 5% $ZrO_2$ | 1350° C. | 77.2 | 85.1 |
| TWS-22 | 35 | 25 | 10 | 20 | 5 | | 5% $Nb_2O_3$ | 1350° C. | 78.0 | 79.4 |
| TWS-23 | 35 | 25 | 10 | 20 | 5 | | 5% $GeO_2$ | 1350° C. | 73.9 | 75.4 |
| TWS-24 | 35 | 25 | 10 | 20 | 5 | | 5% $Cr_2O_3$ | 1350° C. | 80.0 | 85.7 |
| TWS-25 | 35 | 25 | 10 | 20 | 5 | | 5% $Y_2O_3$ | 1350° C. | 62.0 | 63.3 |
| TWS-26 | 35 | 25 | 10 | 20 | 5 | | 5% MgO | 1350° C. | 59.9 | 61.2 |
| TWS-27 | 35 | 25 | 10 | 20 | 5 | | 5% $ErO_2$ | 1350° C. | 58.8 | 60.1 |
| TWS-28 | 35 | 25 | 10 | 20 | 5 | | 5% CaO | 1350° C. | 78.8 | 80.5 |
| TWS-29 | 35 | 25 | 10 | 20 | 5 | | 5% $TiO_2$ | 1350° C. | 80.9 | 82.6 |

| Glass No. | Tg (° C.) | Mg (° C.) | Surface resistance ($10^{10}\Omega/\square$) | Hardness Hv | Young' modulus (Gpa) | Density (g/cm$^3$) | Crystallization Crystallization | Comprehensive assessment |
|---|---|---|---|---|---|---|---|---|
| TWS-1 | 554.0 | 600.0 | 1.2 | 517.0 | 67.0 | 3.9 | | X |
| TWS-2 | 564.0 | 609.0 | 2.7 | 491.0 | 74.0 | 4.0 | | ○ |
| TWS-3 | 570.0 | 617.0 | 2.3 | 502.0 | 69.0 | 4.1 | | ○ |
| TWS-4 | 570.0 | 607.0 | 1.4 | 500.0 | 67.0 | 4.0 | | ○ |
| TWS-5 | 566.0 | 613.0 | 1.0 | 501.0 | 71.0 | 4.1 | | ○ |
| TWS-6 | 585.0 | 630.0 | 7.4 | 486.0 | 65.0 | 3.9 | | ○ |
| TWS-7 | 646.0 | 702.0 | 0.5 | 561.0 | 59.0 | 4.2 | | ○ |
| TWS-8 | 578.0 | 603.0 | 3.5 | 511.0 | 78.0 | 4.6 | Crystallization | X |
| TWS-9 | 536.0 | 578.0 | 0.4 | 509.2 | 76.0 | 4.1 | Crystallization | X |
| TWS-10 | 564.0 | 615.0 | 0.4 | 483.6 | 66.0 | 3.9 | | ○ |
| TWS-11 | 591.0 | 630.0 | 0.2 | 494.5 | 72.9 | 3.8 | | ○ |
| TWS-12 | 450.0 | 483.0 | 0.4 | 492.5 | 68.0 | 3.9 | | ○ |
| TWS-13 | 450.0 | 467.0 | 0.0 | 493.5 | 66.0 | 4.0 | | ○ |
| TWS-14 | 452.0 | 471.0 | 0.1 | 478.7 | 69.9 | 3.9 | | ○ |
| TWS-15 | 454.0 | 469.0 | 0.0 | 552.6 | 64.0 | 4.0 | | ○ |
| TWS-16 | 456.5 | 471.5 | 0.0 | 503.3 | 58.1 | 3.8 | Crystallization | X |
| TWS-17 | 581.7 | 630.0 | 1.3 | 542.9 | 70.4 | 4.1 | | ○ |
| TWS-18 | 592.2 | 639.5 | 2.8 | 515.6 | 77.7 | 4.2 | | ○ |
| TWS-19 | 598.5 | 647.9 | 2.4 | 527.1 | 72.5 | 4.3 | | ○ |
| TWS-20 | 598.5 | 637.4 | 1.5 | 525.0 | 70.4 | 4.2 | | ○ |
| TWS-21 | 594.3 | 643.7 | 1.0 | 526.1 | 74.6 | 4.3 | | ○ |
| TWS-22 | 614.3 | 661.5 | 7.8 | 510.3 | 68.3 | 4.1 | | ○ |
| TWS-23 | 678.3 | 737.1 | 0.5 | 589.1 | 62.0 | 4.4 | | ○ |
| TWS-24 | 606.9 | 633.2 | 3.7 | 536.6 | 81.9 | 4.8 | | ○ |
| TWS-25 | 562.8 | 606.9 | 0.4 | 534.7 | 79.8 | 4.3 | | ○ |
| TWS-26 | 592.2 | 645.8 | 0.4 | 507.8 | 69.3 | 4.1 | | ○ |
| TWS-27 | 620.6 | 661.5 | 0.2 | 519.2 | 76.5 | 4.0 | | ○ |
| TWS-28 | 472.5 | 507.2 | 0.4 | 517.1 | 71.4 | 4.1 | | ○ |
| TWS-29 | 472.5 | 490.4 | 0.0 | 518.2 | 69.3 | 4.2 | | ○ |

In the $V_2O_5$—$WO_3$ conductive glass, a higher content of $WO_3$ can increase the heat resistance temperature. Glasses in the TWS series in Table 1 were used as the $V_2O_5$—$WO_3$ conductive glass having a high content of $WO_3$. The use of $WO_3$ as a material can increase the heat resistance temperature.

In forming any glass in the series, all the materials except $P_2O_5$ were previously mixed because $P_2O_5$ has a great hygroscopic property and thus should not be put in the air for a long time. The powdery mixture except $P_2O_5$ was placed into an alumina crucible which was then put on a scale. A predetermined amount of $P_2O_5$ was weighed and mixed with a metal spoon. At this point, mixing was not performed with a mortar or a ball mill to prevent the influence of moisture in the air.

The alumina crucible containing the abovementioned powdery mixture of the materials was set in a glass melting furnace to start heating. The rate of temperature rise was set to 5° C./min, and after a target temperature is reached, the crucible was held for one hour. The target temperature was set between 1000° C. and 1350° C. in Example 1. After the molten glass was stirred and held for one hour, the alumina crucible was taken out of the melting furnace and put into a graphite mold heated previously at 300° C. The glass put into the graphite mold was moved to a straightening furnace heated previously to a straightening temperature and was held for one hour to perform straightening. Then, the glass was cooled to a room temperature at a rate of 1° C./min. The resulting glass had a size of 30×40×80 mm. Through the procedure, the glasses with compositions shown in Table 1 were formed.

After the evaluation of the surface resistance of the resulting glass block, the glass block was cut into a size of 4×4×15 mm and the thermal expansion coefficient was evaluated. DTA analysis was performed by using power formed by crushing the remaining material.

In Example 1, the various glass compositions as shown in Table 1 can provide the thermal expansion coefficient varying from 60 to $80 \times 10^{-7}$/° C. and the surface resistance varying from $10^8$ to $10^{10} \Omega/\square$ and can provide the glass transition point of 450° C. or higher. Since some of the samples were crystallized, they were determined as inappropriate for glass used for the spacer.

Table 1 also shows the evaluation results of the Young's modulus of the glass according to the present invention in Example 1. Depending on the shape of the spacer, the buckling strength of the spacer ranges from approximately 10 to 20 kN/m calculated from the Young's modulus and is sufficient for assembly of the panel. When it is desirable to provide the thermal expansion coefficient of the glass spacer outside the range from 60 to $80 \times 10^{-7}$/° C., a filler material may be mixed at an adequate ratio.

With the similar method, glasses containing no $MoO_3$ were formed at compounding ratios shown in Table 2. The glass which contains no $MoO_3$ can have a relatively high resistance. In addition, the cost can be reduced if the price of Mo is increased.

The glasses shown in Table 2 are preferable for a material of the spacer. Such compounding ratios result in slightly higher thermal expansion coefficients than those of the glass of the compositions shown in Table 1, but various surface resistances can be provide in the range from $10^9$ to $10^{12} \Omega/\square$ and beam deflection can be reduced. In addition, the glass transition point can be at 450° C. or higher to increase the heat resistance temperature.

When BaO or $P_2O_5$ are contained in a small amount or when $WO_3$ is contained in a large amount, the glass is easily crystallized to make it difficult to hold the evenness of the materials. Thus, the optimal ranges in the process include 20 to 45 wt % of $WO_3$, 20 to 40 wt % of $P_2O_5$, 10 to 25 wt % of $V_2O_5$, and 10 to 25 wt % of BaO.

TABLE 2

Glass composition Examples, and characteristics of present invention

| Glass No. | Composition (weight %) | | | | | Melting Temperature | Thermal expansion coefficient ($\times 10^{-7}$/° C.) | |
|---|---|---|---|---|---|---|---|---|
| | $WO_3$ | $P_2O_5$ | BaO | $V_2O_5$ | Others | | 30-350° C. | 30-500° C. |
| WS-1 | 30 | 30 | 20 | 20 | | 1350° C. | 88.0 | 91.1 |
| WS-2 | 40 | 25 | 5 | 25 | 5% $Al_2O_3$ | 1350° C. | 83.5 | 85.0 |
| WS-3 | 40 | 25 | 15 | 20 | | 1350° C. | 80.9 | 89.1 |
| WS-4 | 40 | 30 | 15 | 15 | | 1350° C. | 81.7 | 83.2 |
| WS-5 | 45 | 25 | 10 | 20 | | 1350° C. | 77.4 | 79.0 |
| WS-6 | 50 | 15 | 10 | 25 | | 1350° C. | 87.9 | 89.8 |
| WS-7 | 30 | 40 | 15 | 15 | | 1350° C. | 64.9 | 66.3 |
| WS-8 | 35 | 40 | 5 | 15 | 5% $Al_2O_3$ | 1350° C. | 62.7 | 64.1 |
| WS-9 | 25 | 30 | 25 | 20 | | 1350° C. | 61.6 | 63.0 |
| WS-10 | 25 | 30 | 20 | 25 | | 1350° C. | 82.5 | 84.3 |
| WS-11 | 35 | 40 | 15 | 10 | | 1350° C. | 84.7 | 86.6 |
| WS-12 | 40 | 30 | 10 | 20 | | 1350° C. | 86.4 | 88.2 |
| WS-13 | 45 | 25 | 15 | 15 | | 1350° C. | 88.0 | 89.9 |
| WS-14 | 50 | 25 | 10 | 15 | | 1350° C. | 82.5 | 84.3 |
| WS-15 | 35 | 25 | 15 | 20 | 5% SrO | 1350° C. | 76.7 | 78.1 |
| WS-16 | 35 | 25 | 15 | 20 | 5% $Gd_2O_3$ | 1350° C. | 83.7 | 85.5 |
| WS-17 | 35 | 25 | 15 | 24.5 | 0.5% $CeO_2$ | 1350° C. | 88.0 | 95.6 |
| WS-18 | 35 | 25 | 15 | 20 | 5% $Sb_2O_3$ | 1350° C. | 87.7 | 89.3 |
| WS-19 | 35 | 25 | 15 | 20 | 5% $ZrO_2$ | 1350° C. | 84.9 | 93.6 |
| WS-20 | 35 | 25 | 15 | 20 | 5% $Nb_2O_3$ | 1350° C. | 85.8 | 87.3 |
| WS-21 | 35 | 25 | 15 | 20 | 5% $GeO_2$ | 1350° C. | 81.3 | 82.9 |
| WS-22 | 35 | 25 | 15 | 20 | 5% $Cr_2O_3$ | 1350° C. | 88.0 | 94.2 |
| WS-23 | 35 | 25 | 15 | 20 | 5% $Y_2O_3$ | 1350° C. | 68.1 | 69.6 |
| WS-24 | 35 | 25 | 15 | 20 | 5% MgO | 1350° C. | 65.8 | 67.3 |
| WS-25 | 35 | 25 | 15 | 20 | 5% $ErO_2$ | 1350° C. | 64.7 | 66.1 |
| WS-26 | 35 | 25 | 15 | 20 | 5% CaO | 1350° C. | 86.6 | 88.5 |
| WS-27 | 35 | 25 | 15 | 20 | 5% $TiO_2$ | 1350° C. | 88.9 | 90.9 |

| Glass No. | Tg (° C.) | Mg (° C.) | Surface resistance ($10^{10} \Omega/\square$) | Hardness Hv | Young's modulus (Gpa) | Density (g/cm³) | Crystallization | Comprehensive Assessment |
|---|---|---|---|---|---|---|---|---|
| WS-1 | 598.5 | 647.9 | 63.8 | 492.0 | 67.6 | 4.0 | | |
| WS-2 | 598.5 | 637.4 | 155.5 | 490.0 | 65.7 | 3.9 | Crystallization | X |

TABLE 2-continued

Glass composition Examples, and characteristics of present invention

| | | | | | | | | |
|---|---|---|---|---|---|---|---|---|
| WS-3 | 594.3 | 643.7 | 200.5 | 491.0 | 69.6 | 4.0 | | ○ |
| WS-4 | 614.3 | 661.5 | 50.8 | 476.3 | 63.7 | 3.8 | | ○ |
| WS-5 | 678.3 | 737.1 | 1.6 | 549.8 | 57.8 | 4.1 | | ○ |
| WS-6 | 606.9 | 633.2 | 5.3 | 500.8 | 76.4 | 4.5 | Crystal-lization | X |
| WS-7 | 562.8 | 606.9 | 14.8 | 499.1 | 74.5 | 4.0 | | ○ |
| WS-8 | 592.2 | 645.8 | 75.2 | 474.0 | 64.7 | 3.8 | Crystal-lization | X |
| WS-9 | 620.6 | 661.5 | 112.5 | 484.6 | 71.4 | 3.7 | | ○ |
| WS-10 | 472.5 | 507.2 | 1.3 | 482.7 | 66.6 | 3.8 | | ○ |
| WS-11 | 472.5 | 490.4 | 20.6 | 483.6 | 64.7 | 3.9 | | ○ |
| WS-12 | 474.6 | 494.6 | 12.8 | 469.1 | 68.5 | 3.9 | | ○ |
| WS-13 | 476.7 | 492.5 | 37.4 | 541.5 | 62.7 | 3.9 | | ○ |
| WS-14 | 479.3 | 495.1 | 0.5 | 493.3 | 57.0 | 3.8 | Crystal-lization | X |
| WS-15 | 610.8 | 661.5 | 110.7 | 532.0 | 68.9 | 4.0 | | ○ |
| WS-16 | 621.8 | 671.4 | 56.1 | 505.2 | 76.1 | 4.1 | | ○ |
| WS-17 | 628.4 | 680.2 | 67.0 | 516.6 | 71.0 | 4.2 | | ○ |
| WS-18 | 628.4 | 669.2 | 163.3 | 514.5 | 68.9 | 4.1 | | ○ |
| WS-19 | 624.0 | 675.8 | 210.5 | 515.5 | 73.1 | 4.2 | | ○ |
| WS-20 | 645.0 | 694.6 | 53.3 | 500.1 | 66.9 | 4.0 | | ○ |
| WS-21 | 712.2 | 774.0 | 1.7 | 577.3 | 60.7 | 4.3 | | ○ |
| WS-22 | 637.2 | 664.8 | 5.6 | 525.8 | 80.3 | 4.7 | | ○ |
| WS-23 | 590.9 | 637.2 | 15.5 | 524.0 | 78.2 | 4.2 | | ○ |
| WS-24 | 621.8 | 678.0 | 79.0 | 497.7 | 67.9 | 4.0 | | ○ |
| WS-25 | 651.6 | 694.6 | 118.1 | 508.8 | 75.0 | 3.9 | | ○ |
| WS-26 | 496.1 | 532.5 | 1.3 | 506.8 | 69.9 | 4.0 | | ○ |
| WS-27 | 496.1 | 514.9 | 21.6 | 507.8 | 67.9 | 4.1 | | ○ |

Since the raw powder of $WO_3$ is expensive, glass for spacer containing a reduced amount of $WO_3$ in a starting material was used as glass in the VS series. The glasses in the VS series have thermal expansion characteristics, electric characteristics, and mechanical characteristics which are equivalent to those of the glasses in the TWS series. The glasses in the VS series have slightly lower heat resistance temperatures, but they advantageously can be manufactured at low cost. Table 3 shows glass compositions in the VS series.

TABLE 3

Glass composition examples and characteristics of present invention

| Glass No. | Composition (weight %) | | | | | | | Melting Temperature | Thermal Expansion coefficient ($\times 10^{-7}/°C$) | |
|---|---|---|---|---|---|---|---|---|---|---|
| | $WO_3$ | $P_2O_5$ | BaO | $V_2O_5$ | $Sb_2O_3$ | $Al_2O_3$ | Others | | 30-350° C. | 30-500° C. |
| VS-1 | 10 | 30 | 20 | 40 | | | | 1100° C. | 75.0 | 76.7 |
| VS-2 | 15 | 30 | 15 | 40 | | | | 1000° C. | 77.0 | 78.7 |
| VS-3 | 15 | 30 | 10 | 30 | 10 | 5 | | 1100° C. | 84.0 | 85.8 |
| VS-4 | 20 | 30 | 5 | 25 | 10 | 10 | | 1000° C. | 80.0 | 81.8 |
| VS-5 | 25 | 30 | 20 | 20 | 5 | | | 1100° C. | 75.0 | 76.7 |
| VS-6 | 5 | 35 | 15 | 40 | 5 | | | 1100° C. | 76.0 | 77.7 |
| VS-7 | 10 | 35 | 10 | 35 | 5 | 5 | | 1100° C. | 77.0 | 78.7 |
| VS-8 | 15 | 35 | 10 | 30 | 5 | 5 | | 1100° C. | 78.8 | 80.5 |
| VS-9 | 20 | 35 | 20 | 25 | | | | 1000° C. | 80.9 | 82.6 |
| VS-10 | 25 | 35 | 15 | 20 | 5 | | | 1100° C. | 88.2 | 90.1 |
| VS-11 | 5 | 40 | 10 | 40 | 5 | | | 1000° C. | 84.0 | 85.8 |
| VS-12 | 10 | 40 | 5 | 35 | 5 | 5 | | 1100° C. | 78.8 | 80.5 |
| VS-13 | 15 | 40 | 20 | 25 | | | | 1100° C. | 79.8 | 81.6 |
| VS-14 | 20 | 40 | 15 | 25 | | | | 1100° C. | 80.9 | 82.6 |
| VS-15 | 25 | 40 | 10 | 20 | | 5 | | 1100° C. | 71.3 | 72.8 |
| VS-16 | 15 | 30 | 15 | 35 | | | 5% $Y_2O_3$ | 1200° C. | 73.2 | 74.8 |
| VS-17 | 15 | 30 | 15 | 35 | | | 5% SrO | 1200° C. | 79.8 | 81.6 |
| VS-18 | 15 | 30 | 15 | 35 | | | 5% $CeO_2$ | 1200° C. | 76.0 | 77.7 |
| VS-19 | 15 | 30 | 15 | 35 | | | 5% $GeO_2$ | 1200° C. | 71.3 | 72.8 |
| VS-20 | 15 | 30 | 15 | 35 | | | 5% $ZrO_2$ | 1200° C. | 72.2 | 73.8 |

| Glass No. | Tg (°C.) | Mg (°C.) | Surface resistance ($10^{10}\Omega/$) | Hardness Hv | Young's Modulus (Gpa) | Density (g/cm$^3$) | Crystal-lization | Comprehensive assessment |
|---|---|---|---|---|---|---|---|---|
| VS-1 | 446.0 | 483.0 | 0.4 | 492.5 | 68.0 | 3.9 | | |
| VS-2 | 450.0 | 467.0 | 0.0 | 493.5 | 66.0 | 4.0 | | ○ |

TABLE 3-continued

Glass composition examples and characteristics of present invention

| | | | | | | | | |
|---|---|---|---|---|---|---|---|---|
| VS-3 | 452.0 | 471.0 | 0.1 | 478.7 | 69.9 | 3.9 | | ○ |
| VS-4 | 435.0 | 450.0 | 0.0 | 552.6 | 64.0 | 4.0 | | ○ |
| VS-5 | 445.0 | 460.0 | 0.0 | 503.3 | 58.1 | 3.8 | Crystal-lization | X |
| VS-6 | 450.0 | 465.0 | 0.0 | 486.0 | 76.8 | 4.1 | | ○ |
| VS-7 | 429.0 | 444.0 | 0.0 | 561.0 | 81.0 | 4.5 | | ○ |
| VS-8 | 468.3 | 507.2 | 0.4 | 517.1 | 71.4 | 4.1 | | ○ |
| VS-9 | 472.5 | 490.4 | 0.0 | 518.2 | 69.3 | 4.2 | | ○ |
| VS-10 | 474.6 | 494.6 | 0.1 | 502.6 | 73.4 | 4.1 | Crystal-lization | X |
| VS-11 | 456.8 | 472.5 | 0.0 | 580.2 | 67.2 | 4.2 | | ○ |
| VS-12 | 467.3 | 483.0 | 0.0 | 528.5 | 61.0 | 4.0 | | ○ |
| VS-13 | 472.5 | 488.3 | 0.0 | 510.3 | 80.7 | 4.3 | | ○ |
| VS-14 | 450.5 | 466.2 | 0.0 | 589.1 | 85.1 | 4.7 | | ○ |
| VS-15 | 423.7 | 458.9 | 0.4 | 467.9 | 64.6 | 3.7 | Crystal-lization | X |
| VS-16 | 427.5 | 443.7 | 0.0 | 468.8 | 62.7 | 3.8 | | ○ |
| VS-17 | 429.4 | 447.5 | 0.1 | 454.8 | 66.4 | 3.8 | | ○ |
| VS-18 | 413.3 | 427.5 | 0.0 | 525.0 | 60.8 | 3.8 | | ○ |
| VS-19 | 422.8 | 437.0 | 0.0 | 478.2 | 55.2 | 3.6 | | ○ |
| VS-20 | 427.5 | 441.8 | 0.0 | 461.7 | 73.0 | 3.9 | | ○ |

The glass samples were formed and evaluated in the same manner as those in the TWS series. Table 3 also shows the evaluation results. The glasses in the VS series can have heat resistance temperatures of at least 400° C. Since some of the samples were crystallized, they were determined as inappropriate for glass used for the spacer.

Example 2

Example 2 will be described in conjunction with an example of forming an image display panel according to the present invention on which spacers made of $V_2O_5$—$WO_3$ glass are mounted. TWS-5 was selected from the $V_2O_5$—$WO_3$ glasses made in Example 1 and shown in Table 1 to form a glass bulk in the shape of a rectangular parallelepiped of 200×50×30 mm in a glass melting furnace capable of a melting amount of 750 cc. Although the same formation procedure as that in Example 1 was used, the straightening step was performed for three hours due to the larger size of glass.

The glass bulk after the straightening was cut into pieces of 110 mm×3.0 mm×0.2 mm by a high-precision cutter. The surface of 110 mm×3.0 mm was subjected to mirror polishing to provide a $V_2O_5$—$WO_3$ glass spacer. The spacer thus formed was used to form an image display panel as described below.

FIGS. 1(a) and 1(b) is a diagram for explaining a specific example of the image display panel according to the present invention. FIG. 1(a) is a perspective view and FIG. 1(b) is a schematic section view taken along a line A-A' in FIG. 1(a). In FIGS. 1(a) and 1(b), a signal line (data line, cathode electrode line) CL and a scanning line (gate electrode line) GL are formed on the inner face of a back substrate SUB1 forming part of a back panel PNL1, and an electronic source ELS is formed at the intersection of the signal line CL and the scanning line GL. A scanning line lead, not shown, is formed at the end of the scanning line GL, and a signal line lead, not shown, is formed at the end of the signal line CL.

A shading film (black matrix) BM, an anode (metal back) AD, a fluorescent material layer PH and the like are formed on the inner face of a front substrate SUB2 forming part of a front panel PNL2. The back substrate SUB1 forming part of the back panel PNl1 is bonded to the front substrate SUB2 forming part of the front panel PNL2 by a sealing material FGM with a sealing frame (frame glass) MFL placed on the periphery. To hold the gap between the bonded substrates at a predetermined value, the abovementioned spacer SPC is bonded and stood with a conductive bonding material (such as conductive glass frit, see FIGS. 2 and 3) between the back substrate SUB1 and the front substrate SUB2.

The inner space sealed by the back panel PNL1, the front panel PNL2, and the sealing frame MFL is evacuated through an exhaust tube, not shown, provided for part of the back panel PNL1 and is held in a predetermined vacuum state. The structures thereof are later described.

Figure 1:
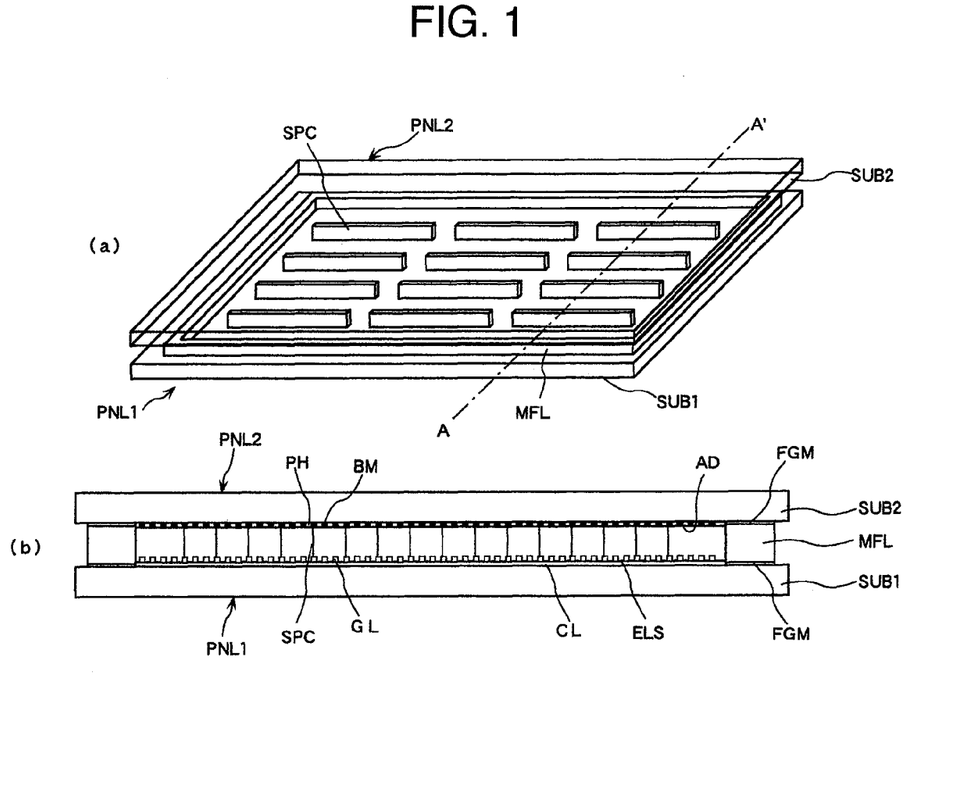
FIGS. 1A and 1B are diagrams for explaining a specific example of an image display panel according to the present invention.
Figure 2:
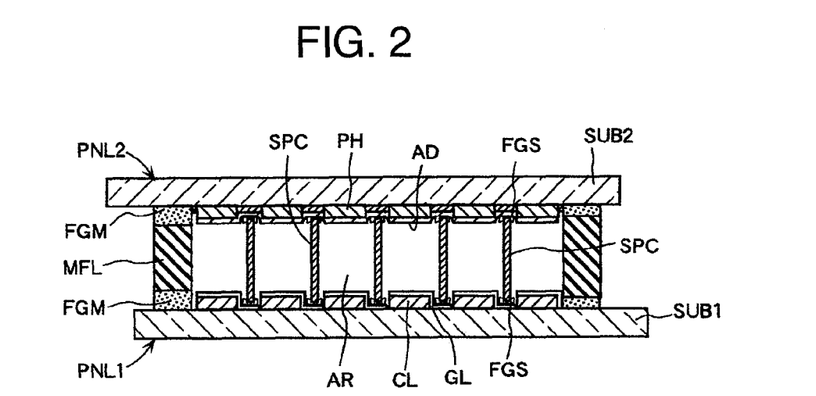
FIG. 2 is a schematic diagram for explaining the detailed structure of the section taken along a line A-A' of FIG. 1.
Figure 3:
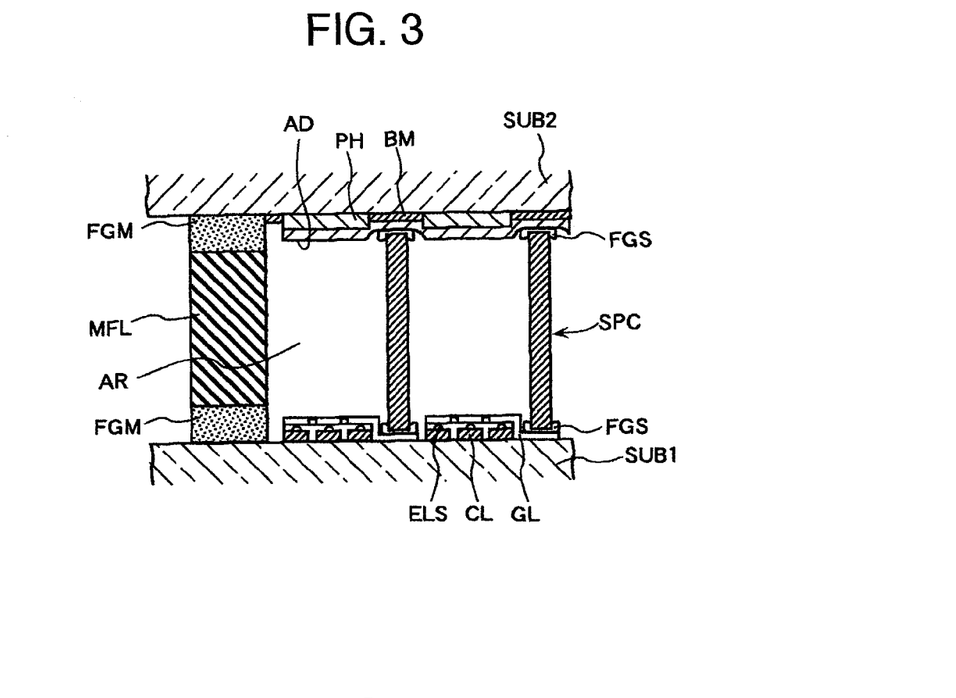
FIG. 3 is an enlarged view showing the section of the main portions of FIG. 2.

FIG. 2 is a schematic diagram showing the detailed structure of the panel in the section view taken along the line A-A' in FIG. 1. FIG. 3 is an enlarged view showing the section of the main portions of FIG. 2. In FIGS. 2 and 3, the back substrate SUB1 forming part of the back panel PNL1 and the front substrate SUB2 forming part of the front panel PNL2 are integrated with the frame glass MFL disposed on the periphery. The same reference numerals as those in FIG. 1 correspond to the portions having the same functions. The frame glass MFL, the back substrate Sub1, and the front substrate SUB2 are held and fixed by the sealing material FGM with a gap of approximately 3 mm between them, for example. In a display area, the spacer SPC for holding the gap between the back substrate SUB1 and the front substrate SUB2 is fixed by the conductive bonding material FGS.

The spacer SPC is based on phosphate glass containing a transition metal element as described above and is made of the materials described in Example 1. The glass may contain a filler for adjusting the thermal expansion coefficient.

Figure 4:
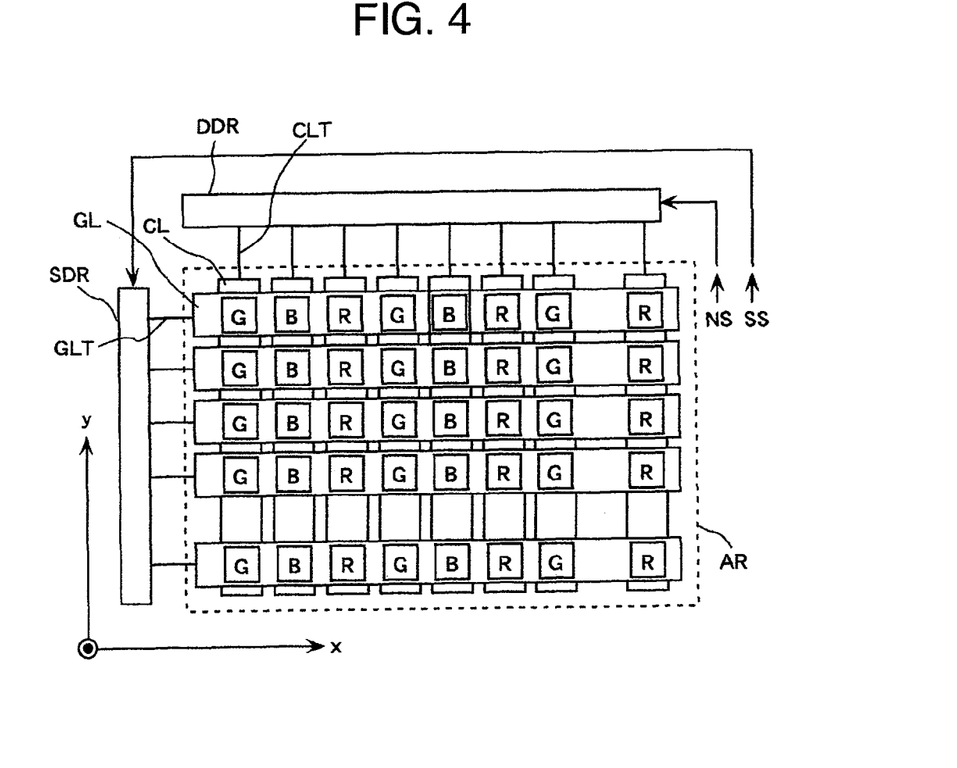
FIG. 4 is a diagram for explaining an example of an equivalent circuit of an image display in which the image display panel according to the present invention is used.

FIG. 4 is a diagram for explaining an example of an equivalent circuit of an image display in which the image display panel according to the present invention is used. An area shown by a broken line in FIG. 4 shows a display area AR in which n signal lines CL and m scanning lines GL are arranged to intersect with each other to form a matrix of n×m. Each of the intersections in the matrix forms a subpixel (unit picture element), and a group of three subpixels "R," "G," and "B" in FIG. 4 form a color picture element (color pixel). The signal line CL is connected to an image signal driving circuit DDR via a signal line lead terminal CLT. The scanning line GL is connected to a scanning signal driving circuit SDR via a scanning line lead terminal GLT. An image signal NS is input to the image signal driving circuit DDR from an external signal source, while a scanning signal SS is input to the scanning signal driving circuit SDR similarly.

With this structure, an image signal can be supplied to the signal lines CL intersecting with the sequentially selected scanning lines GL to display a two-dimensional full color image. The image display panel of this example of structure can be used to realize the image display of a light-emitting flat type with relatively low voltage and high efficiency.

In the image display panel according to the present invention, the spacers described in the abovementioned examples are stood between the back substrate and the front substrate to absorb electric charge on the substrate, which would otherwise be accumulated on the spacer. As a result, the image display capable of high-quality image display can be provided.

While Example 2 has been described in conjunction with the example of the structure including the electronic source of the MIM type, the present invention is not limited thereto but is applicable to an image display panel of a light-emitting type using the abovementioned various electronic sources.

Example 3

In Example 3, a conductive spacer is used which is provided by forming a conductive member on the surface of glass. Example 3 is provided to avoid charging the spacer which is made of insulator and bridges substrates to hold a predetermined gap between them, thereby preventing break of a cathode or another structural portion due to discharge.

Figure 5:
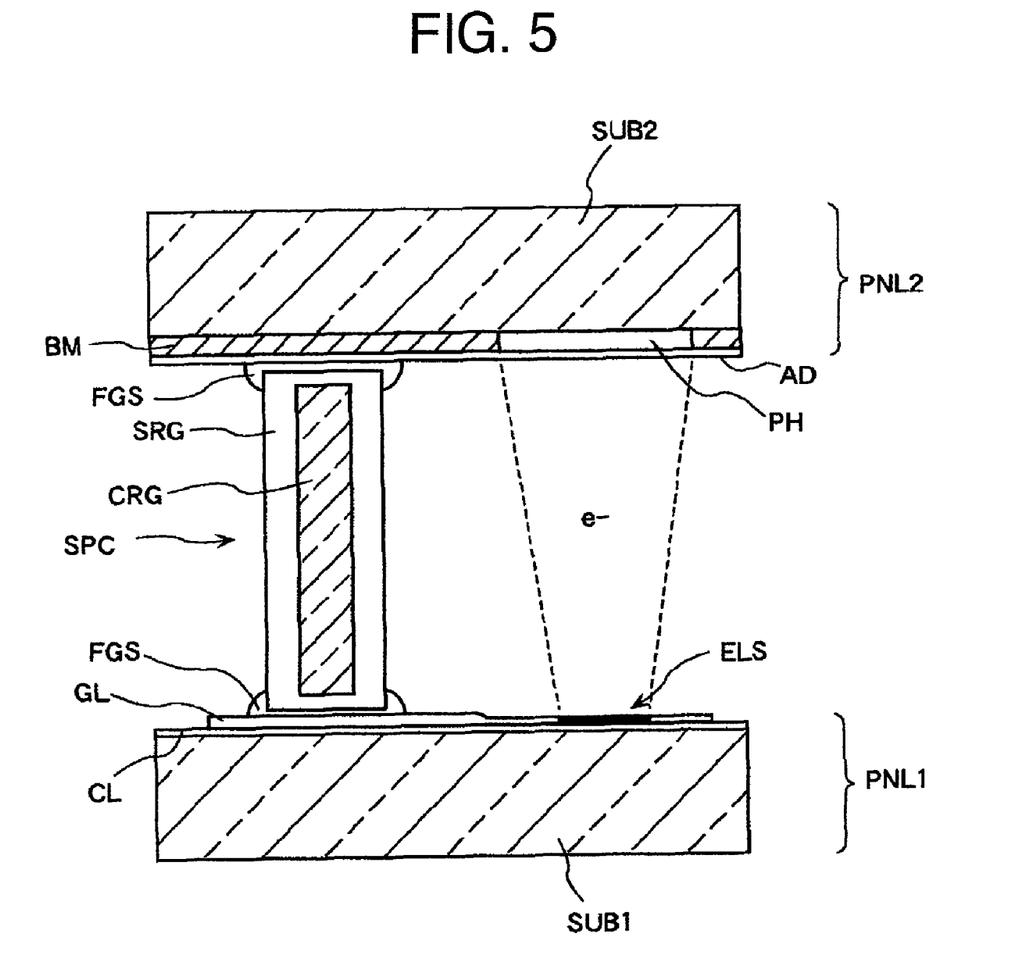
FIG. 5 is a schematic section view for explaining the basic arrangement of a spacer standing structure of the present invention and a display using the spacer standing structure.

FIG. 5 is a schematic section view for explaining the basic arrangement of a spacer standing structure of Example 3 and a display using the spacer standing structure. The display is an electronic emission display which includes a metal film-insulator film-metal film electronic source as an electronic source. The display is formed of a back panel PNL1 including a plurality of scanning lines GL provided for the main surface of a back substrate SUB1 serving as a first substrate, extending in a first direction, and arranged in a second direction intersecting with the first direction, a plurality of signal lines CL formed in a lower layer of the scanning line GL, extending in the second direction, and arranged in the first direction, and an electronic source provided near the intersection of the scanning line GL and the signal line CL, a front panel PNL2 including a front substrate SUB2 serving as a second substrate, a fluorescent material layer PH provided for the main surface of the front substrate SUB 2 and forming a pair with each electronic source ELS, an anode AD, a sealing frame (not shown) inserted into the inner periphery at the ends of the back panel PNL1 and the front panel PNL2 disposed such that the main surfaces thereof, that is, the inner surfaces having the electronic sources EL, the fluorescent material layer PH and the like formed thereon are opposed, to form a decompression vessel together with both of the panels, and a spacer standing structure formed of a spacer SPC bonded between the back panel PNL1 and the front panel PNL2 to hold the gap between the panels at a predetermined value and an adhesion layer FGS.

In the spacer standing structure of Example 3, the spacer according to the present invention is bonded between the opposed surfaces of the first substrate and the second substrate with the adhesion layer to maintain the gap between them at a predetermined value. The spacer is formed of core glass and coat glass which covers the surface of the core glass. The adhesion layer which directly bonds the spacer between the first substrate and the second substrate includes glass of the same type as that of the coat glass.

In Example 3, the spacer is formed of the core glass and the coat glass which coats the surface of the core glass. The space standing structure is formed with the adhesion layer which directly bonds the spacer between the first substrate and the second substrate includes glass of the same type as that of the coat glass.

In a conventional spacer standing structure in which a conductive spacer having a conductive member formed on its surface is bonded with an inorganic adhesive, the inorganic adhesive is easily stripped from the spacer. When a conductive film intervenes to ensure conductive connection between a back substrate and a front substrate, strip easily occurs at the interface between the conductive film and an adhesion layer of glass frit. As a result, the reliability of the display is reduced.

The high-resistance coat glass SRG is made of vanadium phosphorous glass. The core glass CRG may be made of alumino silicate glass, soda glass and the like. In the display of the present invention, the coat glass and the adhesion layer are made of vanadium-based glasses which are mainly made of vanadium and contain tellurium and phosphorus at different weight ratios as additives. The display may include a diffusion layer between the adhesion layer and the coat glass in which the tellurium and the phosphorous are diffused to show weight ratios different from the original weight ratios.

In the display of the present invention, the coat glass preferably has a higher melting point than that of the adhesion layer since the higher melting point can prevent melting of the coat glass during bonding in a subsequent step. For example, the tellurium in the adhesion layer has a concentration higher than that in the coat glass, and the phosphor in the adhesion layer has a concentration lower than that in the coat glass since a larger content of the tellurium reduces the melting point of the glass.

On the other hand, expansion can be reduced by using glass which contains no tellurium. In this case, the ratio between vanadium and phosphor in vanadium phosphorous glass can be varied to change the melting point of the glass as in the abovementioned case. In this case, it is possible that tellurium is not used and a spacer coated with vanadium phosphorous glass is fixed with vanadium phosphorous glass with a lower melting point as in the abovementioned case.

In the display of the present invention, a conductive filler may be mixed into the adhesion layer.

According to the abovementioned structure, the adhesion is improved between the back panel, the front panel, and the spacer. Particularly, the diffusion layer formed between the coat glass and the adhesion layer can significantly improve the adhesion. Since the conductive filler is not diffused, the resistance value of the adhesion layer is maintained, and the charge delivery function is not reduced.

The coat glass of Example 3 was mainly made of 40 to 50 wt% of $V_2O_5$ and 25 to 30 wt% of $P_2O_5$ in terms of oxide. The specific examples are given below. A compound of Te was not added. A metal layer or the like for an electrode was not formed on the spacer.

The use of the abovementioned coat glass can advantageously provide improved adhesion than in conventional articles.

TABLE 4

| Glass No. | Composition (weight %) | | | | | Thermal expansion characteristics | | |
|---|---|---|---|---|---|---|---|---|
| | $V_2O_5$ | $P_2O_5$ | BaO | $Sb_2O_3$ | Others | α(250) | Tg(° C.) | Mg(° C.) |
| 1-A | 55 | 25 | 10 | 10 | | 83 | 356 | 380 |
| 1-B | 52 | 30 | 5 | 10 | $Nb_2O_5$:3 | 77 | 372 | 403 |
| 1-C | 50 | 30 | 10 | 10 | | 89 | 361 | 392 |
| 1-D | 52 | 25 | 10 | 5 | $Nb_2O_5$:3 | 84 | 353 | 380 |
| 1-E | 50 | 32 | 6 | 12 | | 81 | 393 | 417 |
| 1-F | 55 | 25 | 5 | 10 | $SiO_2$:5 | 76 | 339 | 370 |
| 1-G | 50 | 30 | 5 | 10 | $GeO_2$:5 | 78 | 381 | 404 |
| 1-H | 45 | 35 | 5 | 10 | $GeO_2$:5 | 79 | 408 | 443 |
| 1-I | 40 | 40 | 5 | 10 | $GeO_2$:5 | 75 | 446 | 483 |
| 1-J | 55 | 35 | 5 | 5 | | 79 | 378 | 407 |
| 1-K | 50 | 40 | 5 | 5 | | 77 | 419 | 446 |
| 1-L | 53 | 27 | 7 | 13 | | 80 | 366 | 396 |
| 1-M | 52 | 28 | 5 | 10 | GeO2:5 | 75 | 370 | 396 |
| 1-N | 53 | 27 | 5 | 10 | $GeO_2$:5 | 76 | 365 | 389 |

The adhesion layer on the cathode side was mainly made of 50 to 65 wt % of $V_2O_5$ and 25 wt % of $P_2O_5$ in terms of oxide. 5 wt % of $TeO_2$ was added to the adhesion layer on the cathode side. Table 5 below shows examples used as the adhesion layer on the cathode side. The use of the adhesion layer on the cathode side described above can advantageously achieve improved adhesion than in conventional articles.

TABLE 5

| Glass No. | Composition (weight %) | | | | | | DTA Measurement results | | | |
|---|---|---|---|---|---|---|---|---|---|---|
| | $V_2O_5$ | $P_2O_5$ | BaO | $TeO_2$ | $Sb_2O_3$ | Others | Tg(° C.) | Mg(° C.) | Ts(° C.) | Tf(° C.) |
| 2-A | 55 | 25 | 7 | 5 | 8 | | 350 | 375 | 430 | 485 |
| 2-B | 55 | 25 | 9 | 5 | 6 | | 370 | 395 | 445 | 495 |
| 2-C | 55 | 25 | 5 | 5 | 7 | $WO_3$:3 | 345 | 365 | 425 | 480 |
| 2-D | 55 | 25 | 5 | 5 | 9 | $Cr_2O_3$:1 | 340 | 365 | 425 | 480 |
| 2-E | 55 | 25 | 5 | 5 | 7 | $Cr_2O_3$:3 | 345 | 360 | 435 | 505 |

The adhesion layer on the anode side was mainly made of 60 to 65 wt % of $V_2O_5$ and 20 to 25 wt % of $P_2O_5$ in terms of oxide. Te was not added to the adhesion layer on the anode side. A conductive filler was added to the adhesion layer on the anode side to provide a higher transition point and a higher pour point than on the cathode side. This is because the spacer adhered to the anode side substrate and then to the cathode side makes it easier to stand the spacer upright as compared with the simultaneous adhesion on both sides. The conductive filler was added at 10 to 30 wt % to the glass of 90 to 70 wt %.

The use of the adhesion layer on the anode side described above can advantageously provide improved adhesion than conventional articles.

The coat layer and the adhesion layers described above were combined to form the display.

The coat glass was slurried and supplied through printing. Adhesion glass was used in paste form through dipping. A structure such as a metal thin film was not provided between the coat layer and the adhesion layer. As a result, a diffusion layer was formed between the adhesion layer and the coat layer. Particularly, the calcination time can be increased to form a large diffusion layer. The observation of the diffusion layer revealed a skewed distribution of concentration formed in P and V. The concentration distribution in the glass of each composition effectively reduces a difference in properties such as the thermal expansion coefficient and the glass transition point to improve adhesion than in conventional articles. In addition, the diffusion layer can prevent stress from concentrating on a particular portion to attain adhesion with excellent durability, so that a flat display can be provided with superior durability.

The observation of the abovementioned compositions showed that the most desirable combination was the coat

TABLE 6

| Glass No. | Composition (weight %) | | | | | DTA Measurement results | | | |
|---|---|---|---|---|---|---|---|---|---|
| | $V_2O_5$ | $P_2O_5$ | BaO | $Sb_2O_3$ | Others | Tg(° C.) | Mg(° C.) | Ts(° C.) | Tf(° C.) |
| 3-A | 62 | 25 | 5 | 5 | $WO_3$:3 | 325 | 345 | 405 | 455 |
| 3-B | 60 | 25 | 5 | 5 | $Cr_2O_3$:5 | 325 | 345 | 420 | 485 |
| 3-C | 60 | 20 | 5 | 5 | $Cr_2O_3$:10 | 325 | 345 | 405 | 475 | layer of 1-L, the adhesion layer on the anode side of 2-A, and the adhesion layer on the cathode side of 3-B. The combination can advantageously result in enhanced adhesion than in other displays.

Example 4

Example 4 will be described in conjunction with an example in which the resistance temperature coefficient of a spacer is matched with the resistance temperature coefficient of a bonding material forming an adhesion layer.

Figure 6:
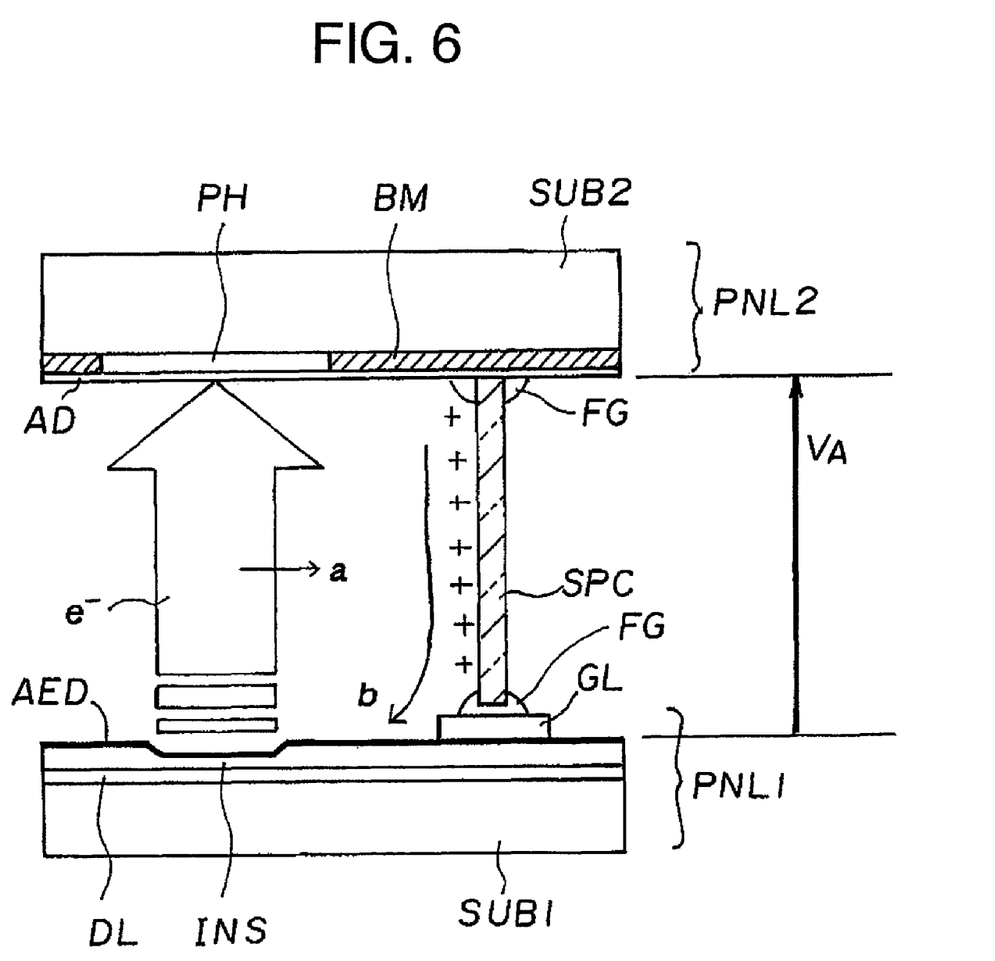
FIG. 6 is a schematic section view of a flat panel image display for explaining Example 4 of the present invention.

The spacer SPC and the bonding material FG have resistance values with some electrical conductivity. Typical resistance values include approximately $1\times10^7$ to $1\times10^{10} \Omega cm$ for the spacer and a lower value for the adhesive. In general, the resistance value is approximately $1\times10^1$ to $1\times10^4$ $\Omega cm$. An electric field is formed between a cathode and an anode such that the electric potential is gradually increased from the cathode to the anode. Part of electrons emitted from the cathode or electrons reflected by the anode reach the surface of the spacer SPC, and positive charge (+) is accumulated. The positive charge attempts to absorb electrons (e−) emitted from the cathode as shown by an arrow a. However, the charge is delivered toward the cathode as shown by an arrow b by the conductivity in accordance with the resistance of the spacer and the conductivity in accordance with the resistance value of the bonding material FG. Typically, the resistance value of the bonding material FG in the display panel of this type is set to be considerably lower than that of the spacer SPC (for example, $\frac{1}{10000}$ or lower) so that the charge on the spacer SPC can be taken out toward the cathode.

The spacer made of glass containing vanadium, phosphoric acid or the like has a negative resistance temperature coefficient (the resistance is lower as the temperature is higher, for example, approximately −1.0 to −2.0%/° C.). In the bonding material in which particles of precious metal having a positive resistance temperature coefficient are dispersed in an insulating low-temperature glass frit to provide electrical conductivity, the bonding material has a positive resistance temperature coefficient (the resistance is higher as the temperature is higher, for example, approximately +0.3 to +1.0%/° C.). When these are combined, an increase in the temperature during operation particularly increases the resistance value of the bonding material on the cathode side. This prevents the charge on the spacer from being taken out in a short time period and the charge may be accumulated on the bonding material.

As a result, electrons emitted from the cathode and not accelerated greatly are pulled by the positive charge on the spacers or the bonding material to bend the path to the anode. The electron flow flies from the cathode toward the anode along the spacer and is pulled by the positive charge along the surface of the spacer, leading to an unnecessary line displayed on a screen to degrade the quality of image display.

To avoid the phenomenon, the resistance values of the spacer and the bonding material are set such that the shadow of the spacer is not displayed. However, if the temperature of the panel is increased during operation, the resistance values of the spacer and the bonding material are changed. If this results in an increase in the resistance vale of the spacer to increase the charge amount, the charge on the spacer cannot be taken out in a short time period even when the resistance value of the bonding material is reduced. Alternatively, if the resistance value of the spacer is reduced, the resistance value of the bonding material is increased, and the charge on the spacer cannot be taken out in a short time period, and the charging on the bonding material is increased to bend the path of the electron flow to cause the unnecessary linear shadow of the spacer to be displayed on the screen. The resistance value of the spacer may be reduced to remove the charge immediately, but an excessive reduction in the resistance value produces thermal runaway of electric current associated with an increased temperature of the spacer. Such a problem is caused by the ratio of resistance values between the bonding material and the spacer depending on the temperature.

The present invention is characterized in that the resistance values of the spacer and the bonding material are increased or reduced in the same direction in response to a change in temperature. Both of the resistance values may be reduced (with a negative resistance temperature coefficient) or increased (with a positive resistance temperature coefficient) such that the resistance values are changed in the same direction (both are reduced or both are increased) when the temperature is changed.

Preferably, the spacer and the bonding layer have a resistance temperature resistance of zero with no change of resistance with the temperature. In reality, however, such a material is not used, and both can have resistance temperature resistances of the same sing to achieve improvements. More preferably, the temperature coefficient of the bonding material is ±15% relative to the temperature coefficient of the spacer.

It is preferable that the spacer and the bonding material have similar numerical values for the temperature coefficients. For example, when the spacer has a resistance temperature coefficient of −1.0 to −2.0%/° C., the bonding material preferably has a resistance temperature coefficient of −1.0 to −2.0%/° C. When the bonding material has a resistance temperature coefficient of +0.3 to +1.0%/° C., the spacer preferably has a resistance temperature coefficient of +0.3 to +1.0%/° C.

Other Examples will hereinafter be described. In Example 4-1, both of the spacer and the bonding material have negative resistance temperature characteristics. Specifically, the resistance is reduced as the temperature is increased, and the resistance is increased as the temperature is reduced. In Example 4-2, both of the spacer and the bonding material have positive resistance temperature characteristics. Specifically, the resistance is increased as the temperature is increased, and the resistance is reduced as the temperature is reduced. The spacer and the bonding material are made of materials selected to provide such relationships in the resistance temperature characteristics, thereby reducing the occurrence of the shade of a spacer SPC due to electric charge.

Thus, according to the structure described above, it is possible to provide a flat panel image display which can provide high-quality image display by correcting a bended electron flow due to increased charge or poor removal of charge caused by a resistance change resulting from a temperature change in the spacer or the bonding material to prevent display of the shadow of the spacer.

Example 4-1

In Example 4-1, both of the spacer SPC and the bonding material FG had negative resistance temperature characteristics.

An anode voltage $V_A$ was applied between the cathode and the anode with a higher potential supplied to the anode side. The anode voltage $V_A$ ranged from 8 to 12 kV, and was 12 kV in this case.

In Example 4-1, a preferable spacer is made of lead-free non-alkali glass containing at least one of tungsten oxide, molybdenum oxide, and vanadium oxide and containing at least phosphorous oxide. This can provide the negative resistance temperature coefficients for the spacer SPC and the bonding material.

The bonding material may be formed of lead-free glass containing vanadium oxide and phosphorous oxide. Since the glass has poor stability in vitrification and poor water resistance, preferably it also contains at least one of antimony oxide, barium oxide, and tellurium oxide as a glass component. The bonding material may contain zinc oxide or zinc phosphate.

The spacer used in Example 4-1 had a composition of 30 wt % of $WO_3$, 15 wt % of $V_2O_5$, 10 wt % of $MoO_3$, 30 wt % of $P_2O_5$, and 15 wt % of BaO in terms of oxide. The spacer had a specific resistance of 1 GΩcm and a resistance temperature coefficient of −1.6%/° C.

Preferably, the spacer had a composition of 25 to 40 wt % of $WO_3$, 10 to 20 wt % of $V_2O_5$, 0 to 15 wt % of $MoO_3$, 25 to 35 wt % of $P_2O_5$, and 10 to 20 wt % of BaO in terms of oxide. The spacer had a resistance temperature coefficient of −1.2 to −1.8%/° C. and a specific resistance of 0.1 G to 10 GΩcm.

When the amount of Mo is reduced, the spacer preferably contains 20 to 45 wt % of $WO_3$, 10 to 25 wt % of $V_2O_5$, 20 to 40 wt % of $P_2O_5$, and 10 to 25 wt % of BaO. The spacer had a surface electric resistance of $1 \times 10^8$ to $1 \times 10^{12}$ Ω/□, a specific resistance of approximately 0.9 GΩcm, and a resistance temperature coefficient of approximately −1.55%/° C.

The bonding material had a composition of 58 wt % of $V_2O_5$, 22 wt % of $P_2O_5$, 8 wt % of $Sb_2O_3$, 5 wt % of BaO, and 7 wt % of $TeO_2$ in terms of oxide. The bonding material had a resistance temperature coefficient of −1.5%/° C. and a specific resistance of 30 MΩcm.

Preferably, the bonding material had a composition of 55 to 65 wt % of $V_2O_5$, 20 to 30 wt % of $P_2O_5$, 5 to 15 wt % of $Sb_2O_3$, 3 to 10 wt % of BaO, and 3 to 10 wt % of $TeO_2$. The bonding material had a resistance temperature coefficient of −1.2 to −1.8%/° C. and a specific resistance of 1 M to 1000 MΩcm.

When 15 w/t parts of particles of zinc oxide were added and bonded to 100 w/t parts of the bonding material of the abovementioned composition, the specific resistance of the bonding material was significantly reduced to 9 kΩcm to 30 MΩcm. This reduced resistance is preferable since the charge on the spacer can be removed more quickly. In the bonding material, zinc phosphate was precipitated from the reaction of glass and zinc oxide. The glass was crystallized. On the other hand, the resistance temperature coefficient was slightly increased. When 30 w/t parts of the zinc oxide were added, the specific resistance of the bonding material was significantly reduced to 230 Ωcm from 30 MΩcm. The glass was changed in the same manner as the abovementioned case of the addition of 15 w/t parts, and some of unreacted zinc oxide remained.

When particles of iron oxide were added, the glass is crystallized as in the addition of zinc oxide and the resistance was reduced significantly. When particles of chromium oxide were added, the resistance was changed from 30 MΩcm to 5 MΩcm and to 0.2 MΩcm in the addition of 15 and 30 wt %, respectively. The glass was not crystallized. The addition amount of any additive preferably ranges approximately 15 to 30 w/t parts.

Two electrodes were formed in a measurement sample and the temperature was once increased to 250° C. in a constant temperature bath and then reduced, and measurements were performed at temperatures from 200° C. to room temperature. The temperature was once increased as described above in order to eliminate the influence of absorbed water. As a result, when a graph is formed with the horizontal axis as the temperature and the vertical axis as the logarithm of the resistance, a substantially linear line is given. The slope of the line was measured as the resistance temperature coefficient.

In such a structure, as the temperature of the display panel is increased, the resistance value of the spacer SPC is reduced and the resistance value of the bonding material FG is also reduced. Conversely, when the temperature of the display panel is reduced, the resistance value of the spacer SPC is increased and the resistance value of the bonding material FG is also increased. In other words, the characteristic curves showing the resistances values of the spacer SPC and the bonding material FG are changed in the same directions in response to the temperature change, that is, the resistance values of both are changed in the same manner in response to the temperature change. As a result, a change in the temperature of the display panel does not cause a large amount of charge accumulated on the spacer SPC, so that the shadow of the spacer SPC due to charge is prevented. In addition, when the spacer and the bonding material have the negative resistance temperature coefficients, it is not necessary that the resistance value of the bonding material is significantly lower than that of the spacer. The resistance value of approximately $1 \times 10^6$ to $1 \times 10^9$ Ωcm may be used, and the reaction control by containing particle of precious metal or zinc oxide may not be performed. This can contribute to lower cost and improved yield.

Example 4-2

In Example 4-2, both of the spacer SPC and the bonding material FG have positive resistance temperature characteristics. The behaviors of the spacer SPC and the bonding material FG in response to a temperature change in this case were opposite to those in Example 4-1, but the resistance values of both were changed in the same manner in response to the temperature change similarly to Example 4-1.

In Example 4-2, glass containing dispersed particles of precious metal can be used as the bonding material. Glass containing dispersed metal particles is preferable for the spacer. This can provide the positive resistance temperature coefficients for the spacer and the bonding material.

The spacer SPC and the bonding material FG of Example 4-2 were made of the glass containing dispersed metal particles such as precious metal having a positive resistance temperature coefficient. As a result, a change in the temperature of the display panel does not cause accumulation of electric charge on the spacer SPC, thereby preventing the shadow of the spacer SPC due to charge. Since both of them have the positive resistance temperature coefficients, thermal runaway of electric current is unlikely to occur.

A sintered body formed by dispersing particles of metal chromium in insulating borosilicate glass was used as the spacer. The spacer had a resistance temperature coefficient of +0.4%/° C. and a specific resistance of 0.06 GΩcm. The bonding material was formed by dispersing metal particles in insulating borosilicate glass. The bonding material had a resistance temperature coefficient of +0.4%/° C. and a specific resistance of 0.03 KΩcm. Since the glass containing dispersed metal particles involves great variations in material characteristics, the combination of Example 4-1 having the negative resistance temperature coefficients and not containing dispersed metal particles is more excellent in the stability of performance as a product.

Example 4-3

Figure 7:
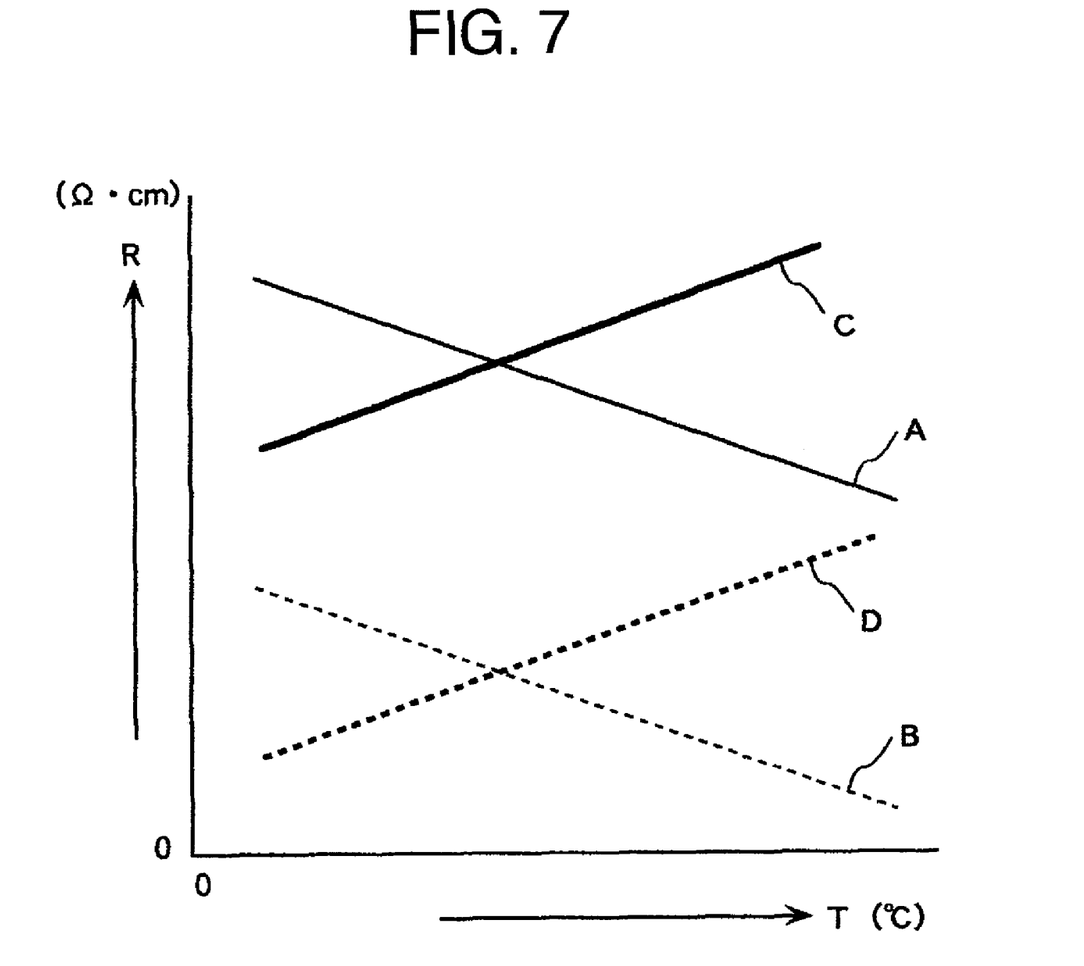
FIG. 7 is a graph for explaining the resistance temperature characteristics of a spacer and a bonding material.

FIG. 7 is a graph for explaining the resistance temperature characteristics of the spacer and the bonding material. The horizontal axis represents the temperature (T ° C.) and the vertical axis represents the resistance value (Ωcm) on arbitrary scales. In FIG. 7, a curve A shows the resistance temperature characteristic of the spacer in Example 4-1, and a curve B shows the resistance temperature characteristic of the bonding material in Example 4-1. A curve C shows the resistance temperature characteristic of the spacer in Example 4-2, and a curve D shows the resistance temperature characteristic of the bonding material in Example 4-2. In FIG. 7, the respective characteristics curves are shown by straight lines for ease of explanation.

It should be further understood by those skilled in the art that although the foregoing description has been made on embodiments of the present invention, the invention is not limited thereto and various changes and modifications may be made without departing from the spirit of the invention and the scope of the appended claims.

The invention claimed is:

1. A spacer which holds a gap between insulating substrates at a predetermined value, the gap forming a decompressed space or an evacuated space, the spacer comprising phosphate glass containing a transition metal element, and the spacer bridging the insulating substrates, wherein the spacer comprises at least one of (a) 20 to 40 wt % of $V_2O_5$, 30 to 45 wt % of $P_2O_5$, 1 to 20 wt % of $WO_3$, and 5 to 20 wt % of BaO, (b) 20 to 45 wt % of $WO_3$, 20 to 40 wt % of $P_2O_5$, 10 to 25 wt % of $V_2O_5$, and 10 to 25 wt % of BaO, (c) 20 to 45 wt % of $WO_3$, 25 to 40 wt % of $P_2O_5$, 10 to 25 wt % of $V_2O_5$, 10 to 25 wt % of BaO, and 5 to 15 wt % of $MoO_3$, and (d) 1 to 10 wt % of SrO, and 1 to 5 wt % of $Gd_2O_3$, and 0.1 to 1.0 wt % of $CeO_2$.

2. The spacer according to claim 1, wherein the phosphate glass includes the same element with different valences.

3. The spacer according to claim 1, wherein the transition metal element includes at least one of vanadium (V), tungsten (W), molybdenum (Mo), niobium (Nb), and iron (Fe).

4. The spacer according to claim 1, wherein the spacer has a surface electrical resistance of $1 \times 10^8$ to $1 \times 10^{12} \Omega/\square$ and a three-point bending strength of 350 MPa or higher.

5. The spacer according to claim 1, wherein the spacer has a surface electrical resistance of $1 \times 10^8$ to $1 \times 1 \Omega/\square$ and a three-point bending strength of 350 MPa or higher.

6. The spacer according to claim 1, wherein the spacer comprises 0.5 to 10 wt % of a compound selected from the group consisting of $Sb_2O_3$, $ZrO_2$, $GeO_2$, $Cr_2O_3$, $Nb_2O_5$, $Al_2O_3$, $Y_2O_3$, MgO, $ErO_2$, CaO, and $TiO_2$.

7. The spacer according to claim 1, wherein the spacer comprises an alkali metal element of 0.5 wt % or lower in terms of oxide ($R_2O$).

8. An image display panel comprising:
a back panel including an insulating substrate, a plurality of scanning lines provided for a main surface of the insulating substrate, extending in a first direction, and arranged in a second direction intersecting with the first direction, a plurality of signal lines extending in the second direction and arranged in the first direction, and an electronic source provided near the intersection of the scanning line and the signal line;
a front panel including a transparent insulating substrate, a fluorescent material layer provided for a main surface of the transparent insulating substrate and forming a pair with each of the electronic sources, an anode;
a sealing frame inserted into the inner periphery at ends of the back panel and the front panel disposed such that their main surfaces are opposed with a predetermined gap between them, to form a decompression vessel together with the panels; and
a spacer which holds the gap between the back panel and the front panels;
wherein the spacer comprises phosphate glass containing a transition metal element; and
wherein the spacer comprises at least one of (a) 20 to 40 wt % of $V_2O_5$, 30 to 45 wt % of $P_2O_5$, 1 to 20 wt % of $WO_3$, and 5 to 20 wt % of BaO, (b) 20 to 45 wt % of $WO_3$, 20 to 40 wt % of $P_2O_5$, 10 to 25 wt % of $V_2O_5$, and 10 to 25 wt % of BaO, (c) 20 to 45 wt % of $WO_3$, 25 to 40 wt % of $P_2$%, 10 to 25 wt % of $V_2O_5$, 10 to 25 wt % of BaO, and 5 to 15 wt % of $MoO_3$, and (d) 1 to 10 wt % of SrO, and 1 to 5 wt % of $Gd_2O_3$, and 0.1 to 1.0 wt % of $CeO_2$.

9. The image display panel according to claim 8, wherein the phosphate glass includes the same element with different valences.

10. The image display panel according to claim 8, wherein the transition metal element includes at least one of vanadium (V), tungsten (W), molybdenum (Mo), niobium (Nb), and iron (Fe).

11. The image display panel according to claim 8, wherein the spacer has a surface electrical resistance of $1 \times 10^8$ to $1 \times 10^{12} \Omega/\square$ and a three-point bending strength of 350 MPa or higher.

12. The image display panel according to claim 8, wherein the spacer has a surface electrical resistance of $1 \times 10^8$ to $1 \times 10^{10} \Omega/\square$ and a three-point bending strength of 350 MPa or higher.

13. The image display panel according to claim 8, wherein the spacer comprises 0.5 to 10 wt % of a compound selected from the group consisting of $Sb_2O_3$, $ZrO_2$, $GeO_2$, $Cr_2O_3$, $Nb_2O_5$, $Al_2O_3$, $Y_2O_3$, MgO, $ErO_2$, CaO, and $TiO_2$.

14. The image display panel according to claim 8, wherein the spacer comprises an alkali metal element of 0.5 wt % or lower in terms of oxide ($R_2O$).

15. A display comprising:
a back panel including an insulating substrate, a plurality of scanning lines provided for a main surface of the insulating substrate, extending in a first direction, and arranged in a second direction intersecting with the first direction, a plurality of signal lines extending in the second direction and arranged in the first direction, and an electronic source provided near the intersection of the scanning line and the signal line;
a front panel including a transparent insulating substrate, a fluorescent material layer provided for a main surface of the transparent insulating substrate and forming a pair with each of the electronic sources, an anode;
a sealing frame inserted into the inner periphery at ends of the back panel and the front panel disposed such that their main surfaces are opposed, to form a decompressed container together with the panels; and
a spacer standing structure bonded between the back panel and the front panel and formed of a spacer which holds a gap at a predetermined value between the panels and an adhesion layer;
wherein the spacer is formed of core glass and coat glass which covers a surface of the core glass;

wherein the adhesion layer which directly bonds the spacer between the back panel and the front panel is formed of glass of the same type as that of the coat glass; and wherein at least one of (a) each of the coat glass and the adhesion layer includes vanadium and phosphorus, and (b) a diffusion layer is provided between the adhesion layer and the coat glass, the diffusion layer including the phosphorus, the content of the phosphorus being different from that of the adhesion layer or the coat glass.

16. The display according to claim 15, wherein the adhesion layer has a melting point lower than that of the coat glass.

17. The display according to claim 15, wherein the adhesion layer includes an electric conductive filler mixed therein.

18. An image display comprising:
a back substrate having a plurality of cathode electrodes and a plurality of electronic sources formed thereon;
a front substrate having an anode electrode and a plurality of fluorescent materials opposed to the electronic sources; and
a plurality of spacers which hold a gap between the front substrate and the back substrate,
wherein the spacer is fixed to each of the back substrate and the front substrate with a bonding material, the spacer comprises glass having a composition of 25 to 40 wt % of $WO_3$, 10 to 20 wt % of $V_2O_5$, 0 to 15 wt % of $MoO_3$, 25 to 35 wt % of $P_2O_5$, and 10 to 20 wt % of BaO, and the bonding material comprises glass having a composition of 55 to 65 wt % of $V_2O_5$, 20 to 30 wt % of $P_2O_5$, 5 to 15 wt % of $Sb_2O_3$, 3 to 10 wt % of BaO, and 3 to 10 wt % of $TeO_2$.

* * * * *